United States Patent
Pearce

(10) Patent No.: US 8,423,903 B2
(45) Date of Patent: Apr. 16, 2013

(54) ASPECT RATIO HINTING FOR RESIZABLE VIDEO WINDOWS

(75) Inventor: James Edward Pearce, Silchester (GB)

(73) Assignee: GVBB Holdings S.A.R.L., Luxembourg (LU)

( * ) Notice: Subject to any disclaimer, the term of this patent is extended or adjusted under 35 U.S.C. 154(b) by 530 days.

(21) Appl. No.: 12/450,688

(22) PCT Filed: Jun. 26, 2007

(86) PCT No.: PCT/IB2007/001738
§ 371 (c)(1), (2), (4) Date: Oct. 6, 2009

(87) PCT Pub. No.: WO2008/125897
PCT Pub. Date: Oct. 23, 2008

(65) Prior Publication Data
US 2010/0107118 A1    Apr. 29, 2010

Related U.S. Application Data

(60) Provisional application No. 60/922,848, filed on Apr. 11, 2007.

(51) Int. Cl.
G06F 3/048 (2006.01)
(52) U.S. Cl.
USPC .......................................................... 715/799
(58) Field of Classification Search .................. 715/799, 715/800
See application file for complete search history.

(56) References Cited

U.S. PATENT DOCUMENTS

| | | | | |
|---|---|---|---|---|
| 5,519,438 | A * | 5/1996 | Elliott et al. | 348/180 |
| 6,922,234 | B2 * | 7/2005 | Hoffman et al. | 356/141.1 |
| 2004/0025112 | A1 * | 2/2004 | Chasen et al. | 715/501.1 |
| 2004/0107415 | A1 * | 6/2004 | Melamed et al. | 717/124 |
| 2004/0113946 | A1 * | 6/2004 | Schlegel | 345/769 |
| 2005/0084153 | A1 * | 4/2005 | Khomo | 382/187 |
| 2006/0117051 | A1 * | 6/2006 | Chin | 707/101 |
| 2006/0238515 | A1 * | 10/2006 | Ohshita | 345/173 |
| 2006/0244735 | A1 * | 11/2006 | Wilson | 345/173 |
| 2007/0136685 | A1 * | 6/2007 | Bhatla et al. | 715/800 |
| 2007/0216782 | A1 * | 9/2007 | Chernoff | 348/231.99 |

(Continued)

FOREIGN PATENT DOCUMENTS

| | | |
|---|---|---|
| JP | 10083272 A | 3/1998 |
| JP | 10254427 A | 9/1998 |

(Continued)

OTHER PUBLICATIONS

European Search Report dated Oct. 28, 2009.

(Continued)

*Primary Examiner* — Omar Abdul-Ali
*Assistant Examiner* — Haimei Jiang
(74) *Attorney, Agent, or Firm* — Arent Fox, LLP

(57) ABSTRACT

A method, apparatus and system for resizing a window in a video display include determining an optimal window edge position based upon an aspect ratio of input content. An on-screen cursor is positioned at a location to initiate a resizing operation. A determination of whether the location is proximate to the optimal window edge position is made. If the location is proximate to the optimal window edge location, a window edge position is adjusted to the optimal window edge position.

16 Claims, 6 Drawing Sheets

U.S. PATENT DOCUMENTS

| | | | |
|---|---|---|---|
| 2007/0234224 A1* | 10/2007 | Leavitt et al. | 715/762 |
| 2007/0247435 A1* | 10/2007 | Benko et al. | 345/173 |
| 2007/0265930 A1* | 11/2007 | Mohr | 705/26 |

FOREIGN PATENT DOCUMENTS

| | | |
|---|---|---|
| JP | 11327520 A | 11/1999 |
| WO | 0154411 A | 7/2001 |
| WO | WO 01/54411 | 7/2001 |
| WO | 2004109467 A | 12/2004 |
| WO | WO 2005/027068 | 3/2005 |

OTHER PUBLICATIONS

Abstract of JP 11327520 published Nov. 26, 1999.

Office Action in Japanese Application No. 2010-502587 mailed Jul. 10, 2012.

Office action for Japanese patent application No. 2010-502587 mailed by the JPO on Jan. 8, 2013.

* cited by examiner

US 8,423,903 B2

ASPECT RATIO HINTING FOR RESIZABLE VIDEO WINDOWS

CROSS-REFERENCE TO RELATED APPLICATIONS

This application claims the benefit, under 35U.S.C. §365of International Application PCT/IB2007/001738 and filed Jun. 26, 2007, which was published in accordance with PCT Article 21 (2) on Oct. 23, 2008, in English and which claims the benefit of U.S. Provisional Patent Application No. 60/922, 848, filed on Apr. 11, 2007, in English.

TECHNICAL FIELD

The present invention relates generally to video processing, and more particularly, to systems and methods for resizing display windows during video playback.

BACKGROUND

Video has an aspect ratio, which defines its intended display shape. Typical aspect ratios are 16:9, which is a wide, rectangular format and 4:3, which is narrower. When video is displayed on a device, or in a user interface window, which does not match the aspect ratio, padding or stretching occurs. In the first case, black bars are added to the picture to maintain the picture aspect ratio, while filling the remaining areas of the display. In the second case, the picture is deformed, which is undesirable and usually to be avoided.

Some display implementations constrain the shape of the playback window to the aspect ratio of the video, or otherwise make no effort to provide the user with an indication of the optimal window size. Other display implementations constrain the shape of the playback window to the aspect ratio setting of the device.

Resizable windows, such as those used in MICROSOFT WINDOWS™, or APPLE OSX™, afford the user the ability to resize windows to any shape. While this provides the user with maximum flexibility in screen layout, it often makes it difficult for the user to find the window size which best matches the video aspect ratio. This makes it difficult to eliminate all black bars (or video deformation if stretching is occurring), and to minimize wasted space on a screen.

SUMMARY

A method, apparatus and system for resizing a window in a video display include a determination of an optimal window edge position based upon an aspect ratio of input content. An on-screen cursor is positioned at a location to initiate a resizing operation. A determination of whether the location is proximate to the optimal window edge position is made. If the location is proximate to the optimal window edge location, a window edge position is adjusted to the optimal window edge position.

Another method for resizing a window in a video display includes positioning an on-screen cursor at an X, Y location to initiate a resizing operation, determining a first dimension optimal window edge position based upon an aspect ratio of input content, and determining whether the location is proximate to the optimal window edge position in the first dimension. If the location is proximate to the first dimension optimal window edge location, a window edge position is adjusted to the optimal window edge position in the first dimension. A second dimension optimal window edge'position is determined based upon the aspect ratio of the input content. A determination of whether the location is proximate to the optimal window edge position in the second dimension is made, and if the location is proximate to the second dimension optimal window edge location, a window edge position is adjusted to the optimal window edge position in the second dimension.

Another method for resizing a window in a video display includes determining an optimal window edge position based upon an aspect ratio of input content, initiating a resizing operation and automatically adjusting a window edge position to the optimal window edge position.

A display system includes a screen configured to display input content and a sensor configured to determine an aspect ratio the input content. A cursor module is configured to generate a cursor such that movement of the cursor to a position on the screen initiates a resize operation. The cursor has an on-screen position. A processor is configured to compute from the aspect ratio an optimal window edge position and compare the on-screen position of the cursor to the optimal window edge position to determine whether the on-screen position is proximate to the optimal window edge position for accordingly resizing a display window on the screen.

BRIEF DESCRIPTION OF THE DRAWINGS

The teachings of the present invention can be readily understood by considering the following detailed description in conjunction with the accompanying drawings, in which.

Figure 1:
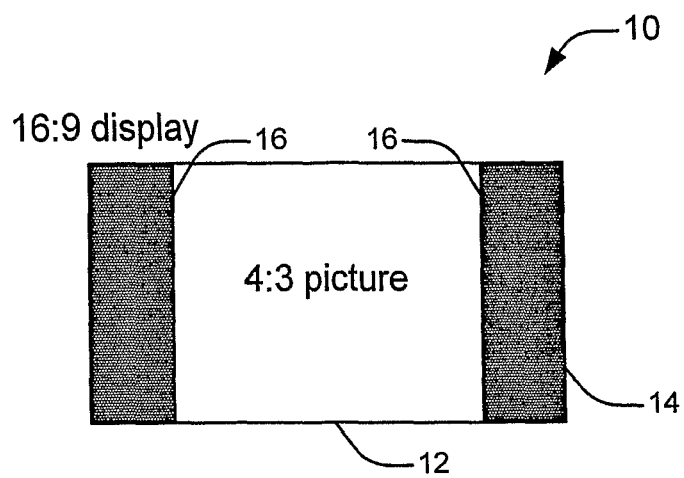
FIG. 1 depicts a display screen showing 16:9 and 4:3 aspect ratios.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF PREFERRED EMBODIMENTS

Principles of the present invention advantageously provide a method, apparatus and system for resizing video windows on displays. The present principles provide a user with the flexibility to resize a video playback window to any size the user desires, while also providing the user with an easy and intuitive way of sizing the window to its optimal size for the video. The present embodiments provide at least two illustrative mechanisms by which the user may resize the playback window to the optimal size, intuitively. One of these includes "sticky" resizing, which provides hints to the user while window resizing takes place. The second is automatic resizing where the user can "double-click" a window boundary to get an optimal sizing.

Although the present invention will be described primarily within the context of these two mechanisms, these mechanisms can be modified, combined and augmented to provide additional mechanisms or methods for carrying out the present principles. Therefore, the specific embodiments disclosed herein should not be treated as limiting the scope of the invention. It will be appreciated by those skilled in the art and informed by the teachings of the present invention that the concepts of the present invention can be advantageously applied in for displays for televisions, computers, telephones and the like.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

Video has an aspect ratio, which describes a shape of a window on a display screen on which the window is to be displayed. The aspect ratio of the video is independent of its pixel and line resolution, meaning that non-square pixels are common in the video domain. When video is displayed on a device whose shape does not match the aspect ratio of the video, a transformation needs to occur. The most common, and least destructive of which is to apply padding. The padding, in the form of black bars, maintains the aspect ratio of the video material, while filling the remaining area of the display. The benefit of this transformation is that no content is lost. Another technique is to stretch the video so that it fills the display device, this causes a distortion which is usually unacceptable.

Referring now in specific detail to the drawings in which like reference numerals identify similar or identical elements throughout the several views, and initially to FIG. 1, a display 10 having 4:3 material displayed in window 12 on a 16:9 sized display area 14 is illustratively shown. Black bars 16 are added to the picture to fill the display area 14. The same issues occur when video is played back through a windowing interface. Resizable windows provide the user with maximum flexibility. Resizable windows permit for personalized layouts that improve productivity. Unfortunately, resizable windows make it difficult for the user to obtain the window size which is optimal for the video being displayed. Typically, a user needs to spend many resize iterations until they are satisfied that the black padding has been fully eliminated.

The re-sizing technique in accordance with the present principles provides at least two mechanisms to improve the user's productivity by intuitively indicating the optimal size, and snapping to that size as needed. The first may be referred to herein as "Sticky Resizing" for ease of reference.

Figure 2:
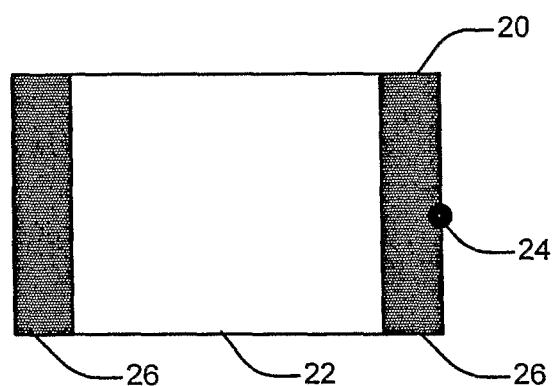
FIG. 2 depicts a display screen with a cursor employed to hint at an optimal resizing of a display window in accordance with an illustrative embodiment.

Referring to FIG. 2, sticky resizing occurs as the user resizes a video window by dragging an edge 20 of a window 22. As the changing window size meets the optimal size plus a threshold (e.g., 10 pixels, although other thresholds can be assigned), the window size 'snaps' and sticks at an optimal size. The optimal or preferred size may include a closest size to the final position of the dragged window edge 20. This remains at the optimal size until the users' resizing takes the window's size outside the threshold. The mouse pointer or cursor is displayed as a dot 24 at the edge 20 of black padding 26.

Figure 3:
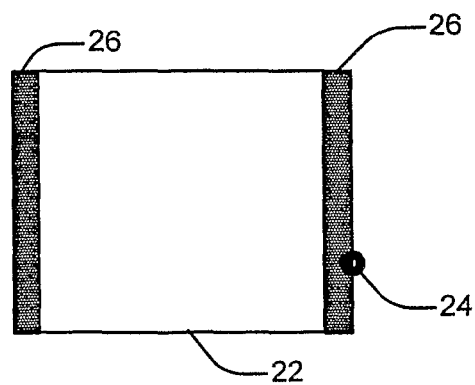
FIG. 3 depicts the display screen of FIG. 2 as the window is being resized.
Figure 4:
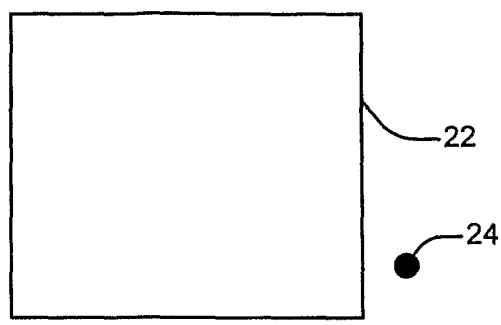
FIG. 4 depicts the display screen of FIG. 3 as the window is set to an optimal position.

Referring to FIG. 3, as the width of the window 22 is reduced by dragging the mouse pointer or cursor inward, the amount of black padding 26 is also reduced, but a visible video area of the window 22 is not reduced. In FIG. 4, as the size of the window 22 reaches its optimal size for the video aspect ratio (plus a threshold) the window 22 snaps and sticks at the optimal size. Note the user's mouse cursor 24 does not follow the snap and instead remains at its position.

Figure 5:
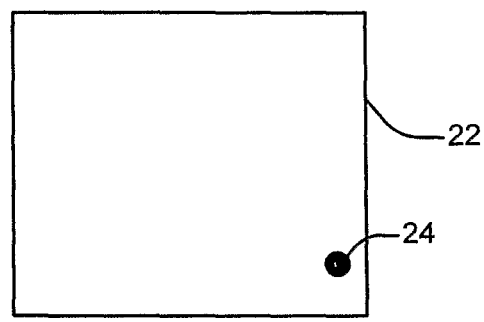
FIG. 5 depicts a display screen with a cursor employed to alter the window size to other than an optimal resizing of the display window in accordance with the illustrative embodiment.
Figure 6:
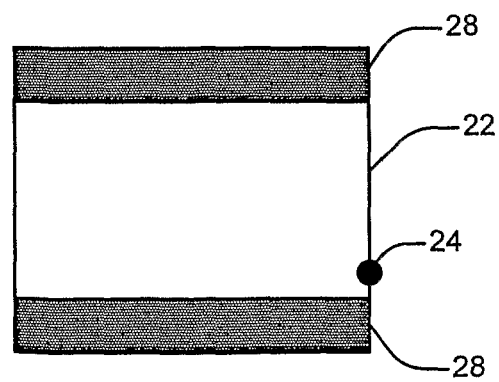
FIG. 6 depicts the display screen of FIG. 5 as the window is set to a user defined position.

The window 22 remains at the optimal size until the user's cursor passes out of the threshold to initiate another resizing operation once the cursor 24 leaves the threshold area. In FIG. 5, the user has continued to move the cursor 24 inward, but the window 22 has stayed at the same size. Once the cursor 24 passes out of the threshold, the window 22 continues to reduce in size as shown in FIG. 6. In FIG. 6, the window 22 is reduced to the point of black padding 28 forming horizontally above and below the window. This approach (with the threshold area) gives the user a larger "target" when resizing the window, and thus improves the speed at which the user can obtain a best possible window size.

Figure 7:
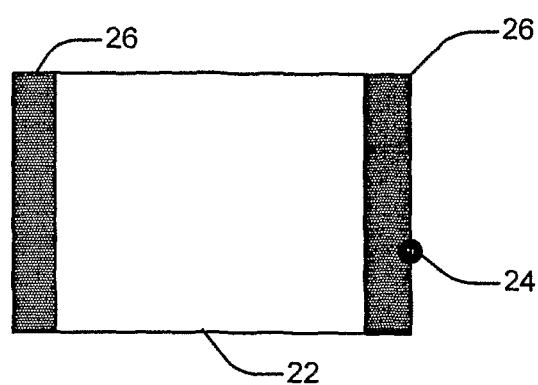
FIG. 7 depicts a display screen with a cursor employed to automatically resize a window to an optimal size in accordance with another illustrative embodiment.
Figure 8:
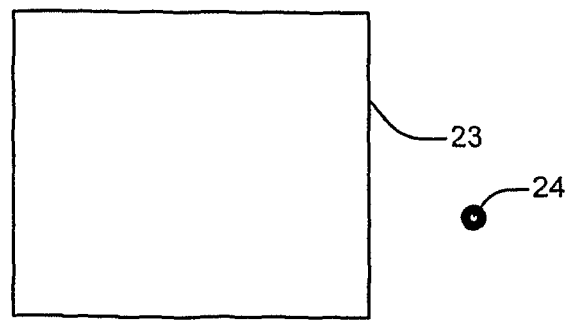
FIG. 8 depicts the display screen of FIG. 7 as the window is set to an optimal position.

Referring to FIGS. 7 and 8, an auto resizing mechanism is illustratively demonstrated in accordance with another embodiment. In this embodiment, when a user indicates to do so (e.g., double-clicks on the edge of the video window 22 or within a threshold area of the window), the window 22 resizes via moving its boundary to an optimal window size 23 for the video aspect ratio as shown in FIG. 8. In one embodiment, the user double clicks the edge, and the window resizes to its optimal size without further input from the user.

Figure 9:
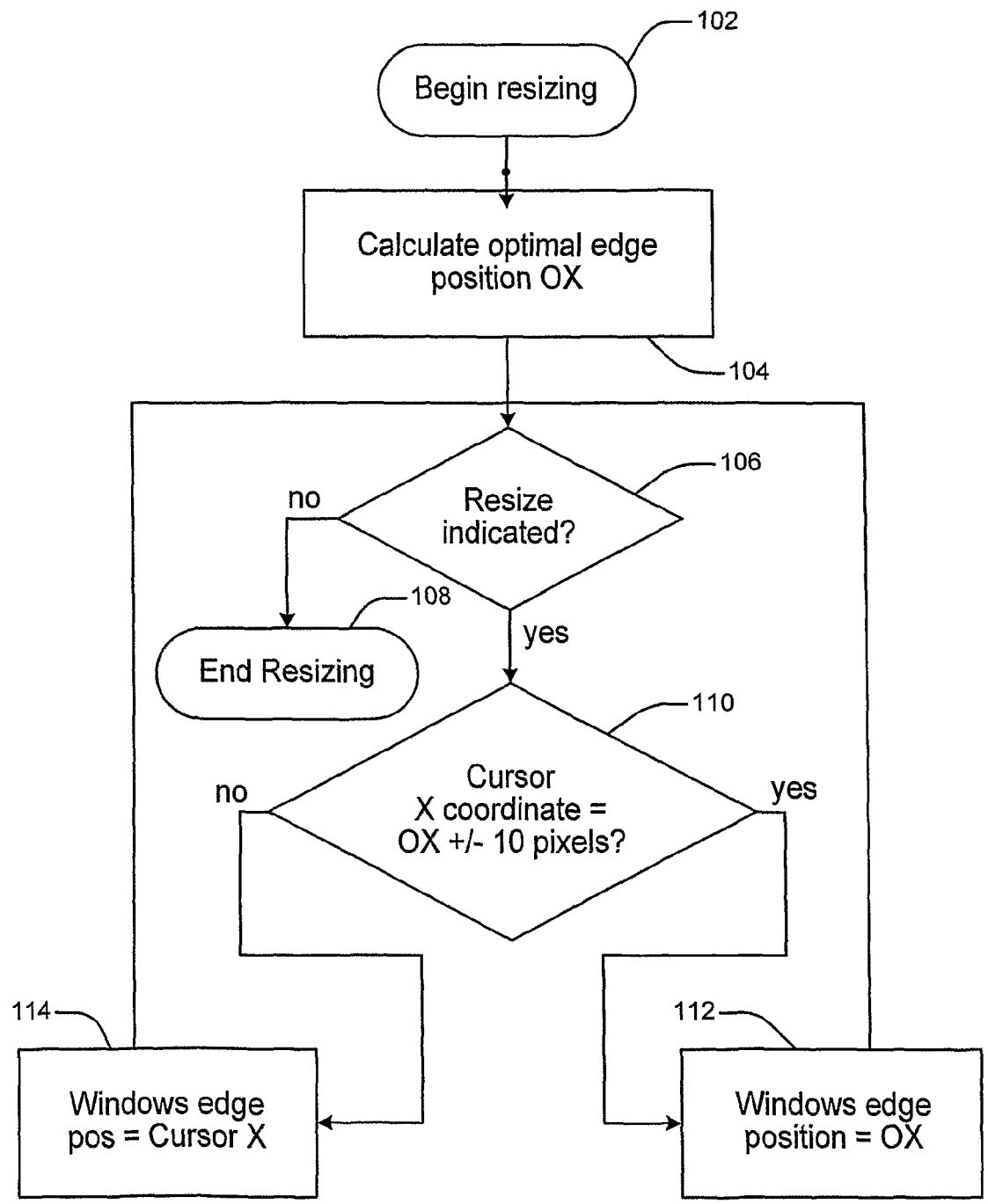
FIG. 9 is a block/flow diagram showing a system/method for resizing a display window in accordance with one illustrative embodiment.

Referring to FIG. 9, a block/flow diagram depicts a system/method which supports aspect ratio hinting for resizing of a vertical edge of a window. The same procedure can be employed for aspect ratio hinting for resizing of a horizontal edge of a window by switching OX with OY as will be described below. This approach which employs a threshold area has the benefit of at least not requiring an optimal edge calculation on every cursor position update. The user gives a hint as to the optimal or desired window size by employing a cursor or other indicating device/mechanism to indicate to the display where the window should be sized. The approach is useful for video display windows with a vertical "edge splitter," for example.

In block 102, the process of resizing begins by permitting a user to indicate that resizing is needed or desired. This can be initiated using a remote control device, buttons, a mouse or any other input device. In a preferred embodiment, a cursor or other visual indication is employed on a screen of a display device. In block 104, an optimal edge position OX is calculated. This is based upon the input image aspect ratio in the X and Y directions and the height (or width) of the window. OX can be calculated in accordance with the following equation:

$$OX = \text{Window Height} * (\text{Aspect Ratio } X / \text{Aspect Ratio } Y) \quad \text{(Eq. 1)}$$

If the position is for the horizontal window sizing:

$$OY = \text{Window Width} * (\text{Aspect Ratio } Y / \text{Aspect Ratio } X) \quad \text{(Eq. 2)}$$

Window height and width can be in accordance with the screen dimensions or the user selected window size. In block 106, a determination is made as to whether the cursor is present on the screen to make the adjustments. If the cursor is not present, then resizing is ended in block 108. Otherwise, in block 110, a check is performed to determine whether the cursor's X coordinate is within a threshold region of the optimal size OX, e.g., + or −10 pixels of OX or a similar measure. If the X coordinate is within the threshold region of OX, the window edge position is set equal to OX (or snaps to OX) in block 112. Otherwise, if the cursor's X coordinate is outside the threshold region the window edge is set to the cursor's X coordinate in block 114. An additional action on the part of the user can be employed to indicate that the cursor is in position for the process to run. For example, once the cursor is positioned, the user may hit a button to initiate a new sizing operation.

It should be understood that the process shown in FIG. 9 can be implemented using the Y coordinate and the optimal Y edge position (OY). In addition, a combination of X and Y adjustment can be provided as well. For example, a user may set the size of the screen in additional to optimal sizing, may permit distortion or cutting off a portion of the picture in accordance with an X/Y cursor position selected by the user. This is described with reference to FIG. 10.

Figure 10:
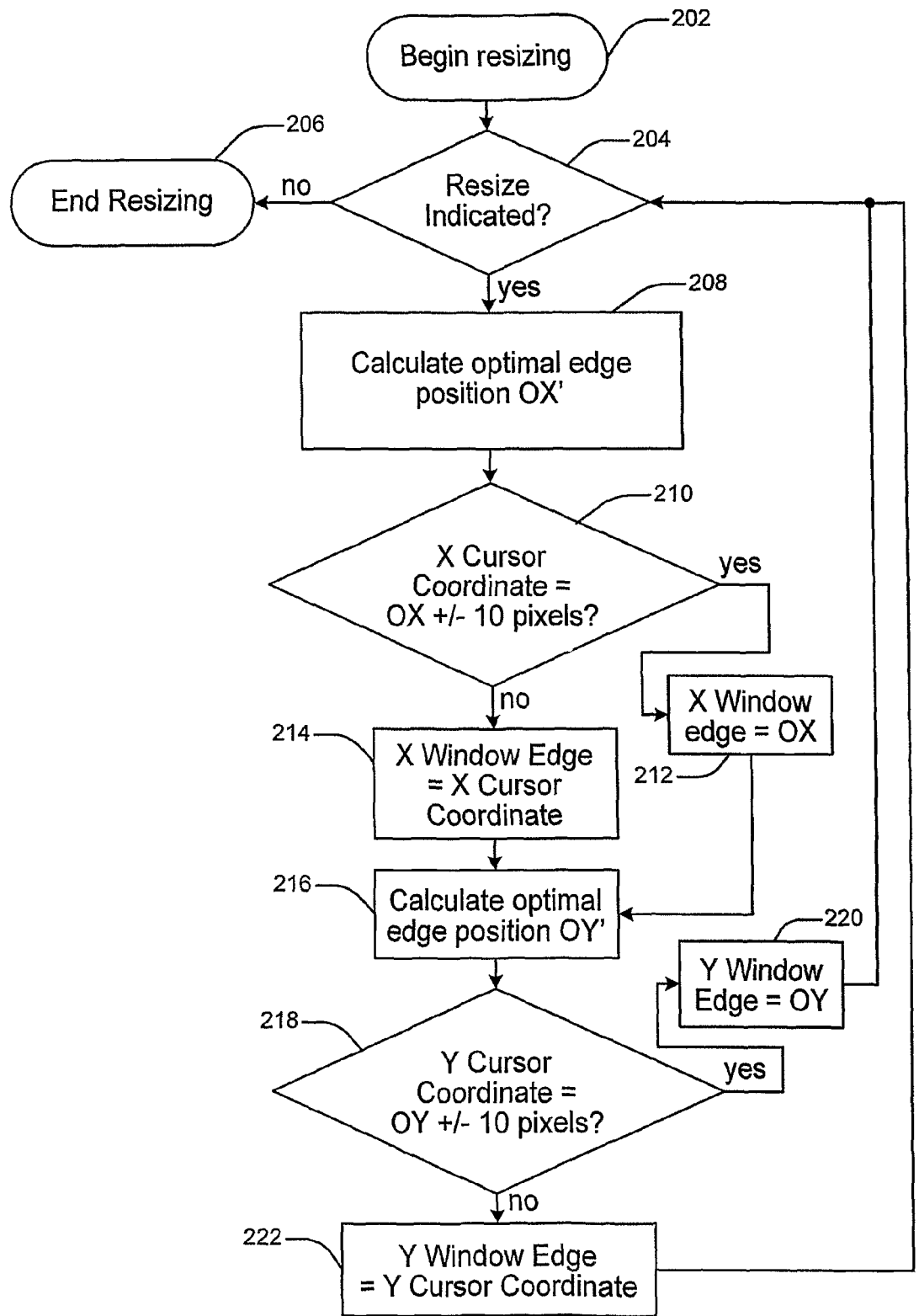
FIG. 10 is a block/flow diagram showing a system/method for resizing a display window using X and Y positions in accordance with another illustrative embodiment.

Referring to FIG. 10, a system/method for supporting aspect ratio hinting for simultaneous resizing of width and height is illustratively shown. The user gives a hint as to the optimal or desired window size by employing a cursor or other indicating device/mechanism to indicate to the display where the window should be sized. In block 202, the process of resizing begins by permitting a user to indicate that resizing is needed or desired. This can be initiated using a remote control device, buttons, a mouse or any other input device. In a preferred embodiment, a cursor or other visual indication is employed on a screen of a display device. In block 204, a determination is made as to whether the cursor is present on the screen to make the adjustments. If the cursor is not present, then resizing is ended in block 206. If the resize is indicated (e.g., the on screen cursor is generated), an optimal edge position OX is calculated in block 208. This is based upon the input image aspect ratio in the X and Y directions and the height (or width) of the window. OX can be calculated in accordance with the equation (1).

In block 210, a check is performed to determine whether the cursor's X coordinate is within a threshold region of the optimal size OX, e.g., + or −10 pixels of OX or a similar measure. If the X coordinate is within the threshold region of OX, the window edge position is set equal to OX (or snaps to OX) in block 212. Otherwise, if the cursor's X coordinate is outside the threshold region the window edge is set to the cursor's X coordinate in block 214. An additional action on the part of the user can be employed to indicate that the cursor is in position for the process to run. For example, once the cursor is positioned the user may hit a button to initiate a new sizing operation.

An optimal edge position OY is calculated in block 216. This is based upon the input image aspect ratio in the X and Y directions and the height (or width) of the window. OY can be calculated in accordance, with the equation (2).

In block 218, a check is performed to determine whether the cursor's Y coordinate is within a threshold region of the optimal size OY, e.g., + or −10 pixels of OY or a similar measure. If the Y coordinate is within the threshold region of OY, the window edge position is set equal to OY (or snaps to OY) in block 220. Otherwise, if the cursor's Y coordinate is outside the threshold region the window edge is set to the cursor's Y coordinate in block 222. An additional action on the part of the user can be employed to indicate that the cursor is in position for the process to run. For example, once the cursor is positioned the user may hit a button to initiate a new sizing operation. The program path returns to block 204 to detect whether the cursor position is present or that it has changed.

It should be understood that the processes shown in FIGS. 9 and 10 can be implemented automatically using the optimal edge positions (OX and OY) computed by the display device. With respect to the automatic sizing embodiment for FIG. 9, if a user indicates (block 106) (e.g., double-clicks (or other suitable action) within the threshold region (block 110 is optional and can be bypassed and block 114 is bypassed) or the window edge), the window edge position is set automatically to OX (or OY) in block 112. With respect to the automatic sizing embodiment for FIG. 10, if a user indicates (block 204) (e.g., double-clicks (or other suitable action) within the threshold region (blocks 210 and/or 218 are optional and can be bypassed and blocks 214 and 222 are bypassed) or the window edge), the window edge position is set automatically to OX and OY in blocks 212 and 220.

Figure 11:
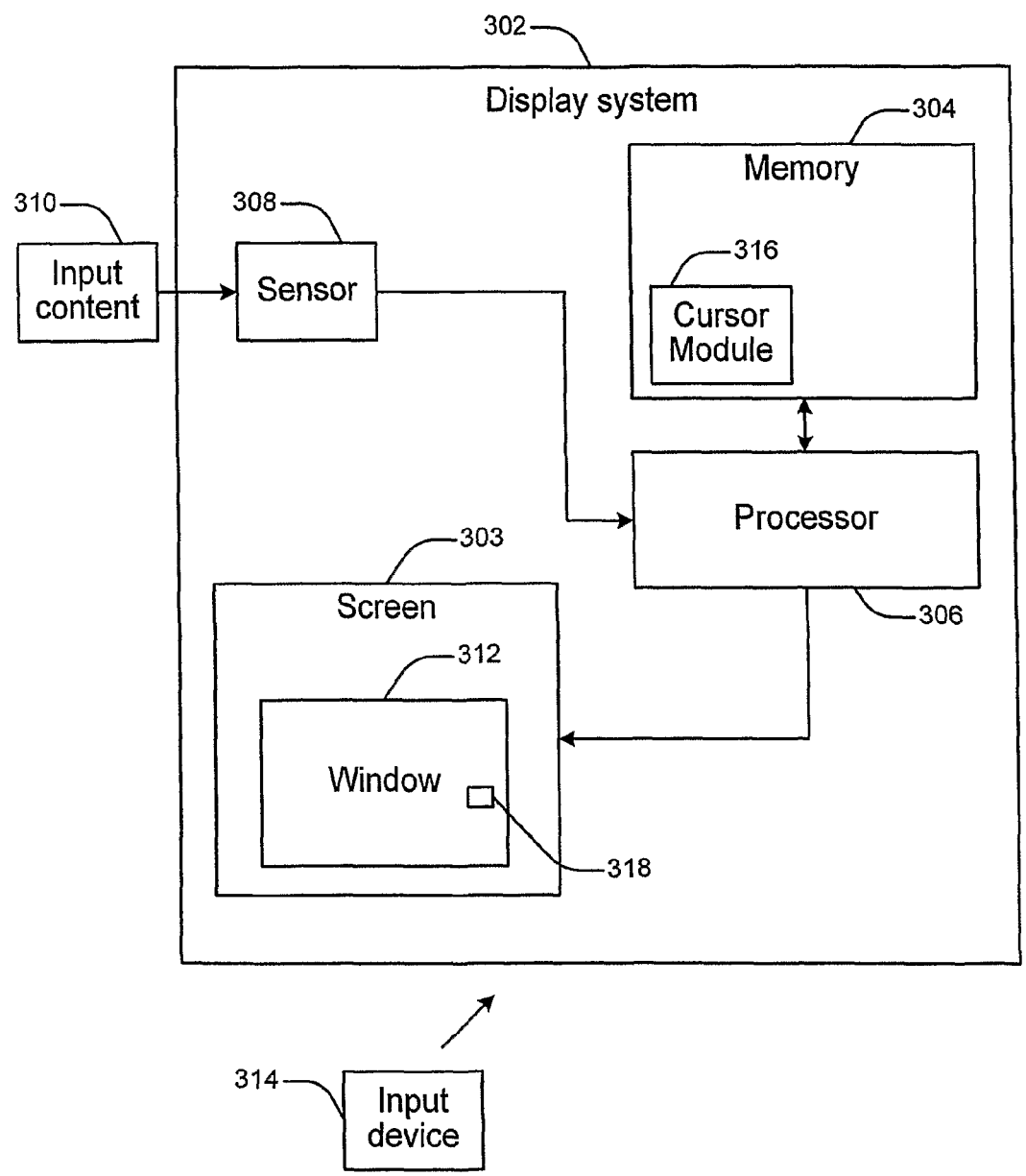
FIG. 11 is a block diagram showing a display system which implements resizing of display windows in accordance with the present principles.

Referring to FIG. 11, a display system 302 is shown in accordance with an illustrative embodiment. Display system 302 includes a sensor 308 for monitoring aspect ratios of input content 310. The sensor 308 determines the aspect ratio and sends this information along with the input content 310 to a processor 306. The processor 306 employs memory 304 to execute the methods/systems of FIGS. 9 and 10, as described above. A cursor module 316 can be stored in memory 304 to provide the functions and visualization of a cursor on a screen 303 during window resizing operations. Processor 306 computes optimal window sizes (e.g., OX and OY) and resizes a window 312 on screen 3030 in accordance with cursor 318.

The cursor 318 can be generated using cursor module 316. The cursor 318 can be generated or initiated by a user having an input device 314. The user initiates the resizing process by hitting a button or otherwise indicating that a resizing is needed or desired. In an alternate embodiment, the cursor module 316 can be employed to determine if an external input device 314 such as a finger on a touch screen, or a light spot (e.g., laser pointer, etc.) is being employed as input for a cursor position. In such an embodiment, the cursor module 316 when executed determines the presence and position of a cursor so generated. Once a cursor 318 is present, the user moves the cursor 318 to resize the window 312 of screen 303. This may continue until the user exits the resize mode.

Alternately, processor 306 uses the aspect ratio information from sensor 308 to resize the window 312 automatically. This can be performed by computing the optimal dimensions of the window (e.g., OX and/or OY) and adjusting the window accordingly with or without user initiation.

Having described preferred embodiments for a method, apparatus and system for aspect ratio hinting for resizable video windows (which are intended to be illustrative and not limiting), it is noted that modifications and variations can be made by persons skilled in the art in light of the above teachings. It is therefore to be understood that changes can be made in the particular embodiments of the invention disclosed which are within the scope and spirit of the invention as outlined by the appended claims. While the forgoing is directed to various embodiments of the present invention, other and further embodiments of the invention can be devised without departing from the basic scope thereof.

The invention claimed is:

1. A method for video window resizing, comprising:
    determining an optimal window edge position of a video window, the optimal window edge position being based on a standard video window size based on an aspect ratio of input content;
    positioning an on-screen cursor at a location to initiate a resizing operation of the video window;
    determining whether a difference between the location and the optimal window edge position is within a threshold number of pixels, with respect to one of an X axis and a Y axis;
    when the difference is within the threshold, automatically adjusting the respective X or Y coordinate of one window edge position to the corresponding X or Y coordinate of the optimal window edge position; and
    when the difference is not within the threshold, automatically adjusting only one window edge position of the window edge to the corresponding X or Y axis coordinate location of the cursor and padding the video window.

2. The method as recited in claim 1, wherein determining an optimal window edge position includes computing a product of window height times an X/Y aspect ratio.

3. The method as recited in claim 1, wherein determining an optimal window edge position includes computing a product of window width times an Y/X aspect ratio.

4. The method as recited in claim 1, wherein determining whether the difference is within the threshold includes determining whether the cursor position is within approximately ten pixels of the optimal window edge position.

5. The method as recited in claim 1, wherein positioning an onscreen cursor at a location to initiate a resizing operation includes positioning the cursor using a user controlled input device.

6. A method for video window resizing, comprising:
    positioning an on-screen cursor at an X, Y location to initiate a resizing operation of a video window;
    determining a first dimension optimal window edge position of the video window, the optimal window edge position being on a standard video window size based upon an aspect ratio of input content;
    determining whether a first difference between the location and the optimal window edge position in the first dimension is within a first threshold number of pixels;
    when the first difference is within the first threshold, adjusting only one window edge position to the optimal window edge position in the first dimension;
    if the location is not proximate to the first dimension optimal window edge location, automatically adjusting a window edge position to the location of the cursor in the first dimension;
    determining a second dimension optimal window edge position based upon the aspect ratio of the input content;
    determining whether a second difference between the location and the optimal window edge position in the second dimension is within a second threshold number of pixels;
    when the second difference is within the second threshold, adjusting only one window edge position to the optimal window edge position in the second dimension, the first dimension corresponding to one of the X axis and the Y axis, and the second dimension corresponding to the other of the X axis and the Y axis;
    if the location is not proximate to the second dimension optimal window edge location, automatically adjusting a window edge position to the location of the cursor in the second dimension; and
    if neither difference is within its respective threshold, padding the video window.

7. The method as recited in claim 6, wherein determining a first dimension optimal window edge position includes computing a product of window height times an X/Y aspect ratio.

8. The method as recited in claim 6, wherein determining a second dimension optimal window edge position includes computing a product of window width times an Y/X aspect ratio.

9. The method as recited in claim 6, wherein determining whether the differences are within a threshold includes determining whether the cursor position is within approximately ten pixels of an optimal window edge position in a given direction.

10. The method as recited in claim 6, wherein positioning an onscreen cursor includes positioning the cursor using a user controlled input device.

11. A display system, comprising:
    a screen configured to display input content;
    a sensor configured to determine an aspect ratio the input content;
    a cursor module configured to generate a cursor such that movement of the cursor to a position on the screen initiates a resize operation of a video window, the cursor having an on-screen position; and
    a processor configured to:
        compute from the aspect ratio an optimal window edge position of the video window, the optimal window edge position being based on a standard video window size based on an aspect ratio of the input content;
        compare the on-screen position of the cursor to the optimal window edge position to determine whether the difference between the on-screen position and the optimal window edge position is within a threshold, with respect to one of an X axis and a Y axis, for accordingly resizing a display window on the screen;
        when the difference is within the threshold, automatically adjust the respective X or Y coordinate of one window edge position to the corresponding X or Y coordinate of the optimal window edge position; and when the difference is not within the threshold, automatically adjusting only one window edge position of the window edge to the corresponding X or Y axis coordinate of the on-screen position of the cursor and padding the video window.

12. The display system as recited in claim 11, wherein the optimal window edge position includes a product of window height times an X/Y aspect ratio.

13. The display system as recited in claim 11, wherein the optimal window edge position includes a product of window width times an Y/X aspect ratio.

14. The display system as recited in claim 11, wherein a difference being within a threshold number of pixels includes being within approximately ten pixels of the optimal window edge position.

15. The method as recited in claim 11, further comprising a user controlled input device configured to position the cursor to initiate resizing.

16. A method for video window resizing, comprising:
determining an optimal window edge position, the optimal window edge position being based on a video standard video window size based upon an aspect ratio of input content;
receiving a user input to initiate a resizing operation of the video window at a cursor location;
determining whether a difference between the location and the optimal window edge position is within a threshold number of pixels, with respect to one of an X axis and a Y axis;
when the difference is within the threshold, automatically adjusting the respective X or Y coordinate of only one window edge position to the corresponding X or Y coordinate of the optimal window edge position; and
when the difference is not within the threshold, automatically adjusting the only one window edge position of the window edge to the corresponding X or Y axis coordinate location of the cursor and padding the video window.

* * * * *